United States Patent
Le et al.

(10) Patent No.: US 8,958,339 B2
(45) Date of Patent: Feb. 17, 2015

(54) METHOD FOR SUPPORTING ROUTING DECISIONS IN A WIRELESS MESH NETWORK AND WIRELESS MESH NETWORK

(75) Inventors: Long Le, Dossenheim (DE); Frank Zdarsky, Karlsruhe/Durlach (DE)

(73) Assignee: NEC Europe Ltd., Heidelberg (DE)

( * ) Notice: Subject to any disclaimer, the term of this patent is extended or adjusted under 35 U.S.C. 154(b) by 151 days.

(21) Appl. No.: 13/257,985

(22) PCT Filed: May 22, 2009

(86) PCT No.: PCT/EP2009/003634
§ 371 (c)(1),
(2), (4) Date: Sep. 21, 2011

(87) PCT Pub. No.: WO2010/133243
PCT Pub. Date: Nov. 25, 2010

(65) Prior Publication Data
US 2012/0008527 A1    Jan. 12, 2012

(51) Int. Cl.
*H04L 12/28* (2006.01)
*H04W 48/08* (2009.01)
*H04W 8/00* (2009.01)
*H04W 40/24* (2009.01)
*H04W 48/16* (2009.01)
*H04W 76/02* (2009.01)
*H04W 88/16* (2009.01)

(52) U.S. Cl.
CPC ............. *H04W 48/08* (2013.01); *H04W 8/005* (2013.01); *H04W 40/246* (2013.01); *H04W 48/16* (2013.01); *H04W 76/02* (2013.01); *H04W 88/16* (2013.01)

USPC ............................. 370/254; 370/255; 370/256

(58) Field of Classification Search
CPC ...................................................... H04W 48/08
USPC ......... 370/254–256, 229, 230, 231, 338, 389, 370/392
See application file for complete search history.

(56) References Cited

U.S. PATENT DOCUMENTS 7,505,751 B1 *  3/2009  Backes ........................ 455/332
7,924,831 B2 *  4/2011  Seok ............................ 370/389
(Continued)

OTHER PUBLICATIONS

International Search Report, dated Oct. 14, 2009, from corresponding PCT application.
(Continued)

*Primary Examiner* — Chuong T Ho
(74) *Attorney, Agent, or Firm* — Young & Thompson

(57) ABSTRACT

A method for supporting routing decisions in a wireless mesh network, wherein the network (1) includes a multitude of wireless mesh nodes (2) and wherein at least two of the multitude of wireless mesh nodes (2) function as wireless mesh gateways (3) being connected to a wired infrastructure network (5) via wired and/or wireless links. With respect to an efficient routing of intra-mesh traffic that avoids congestions at the mesh gateways (3) as far as possible, the method includes the steps of performing a discovery mechanism for the wireless mesh gateways (3) to find and/or identify each other, establishing virtual wireless mesh links between the wireless mesh gateways (3) via the wired infrastructure network (5), determining the characteristics of the virtual wireless mesh links, and announcing the characteristics to the wireless mesh nodes (2). Further, a corresponding wireless mesh network with routing decision support is disclosed.

3 Claims, 3 Drawing Sheets

(56) References Cited

U.S. PATENT DOCUMENTS

| | | | |
|---|---|---|---|
| 8,014,370 B2* | 9/2011 | Banerjea et al. | 370/338 |
| 8,565,164 B2* | 10/2013 | Backes | 370/329 |
| 8,738,013 B2* | 5/2014 | Banerjea et al. | 455/445 |
| 8,780,762 B2* | 7/2014 | Patil et al. | 370/255 |
| 2003/0087629 A1 | 5/2003 | Juitt et al. | |
| 2005/0124346 A1* | 6/2005 | Corbett et al. | 455/446 |
| 2006/0230150 A1 | 10/2006 | Roy | |
| 2006/0268879 A1* | 11/2006 | Xhafa et al. | 370/392 |
| 2007/0214046 A1* | 9/2007 | Falchuk et al. | 705/14 |
| 2007/0248065 A1* | 10/2007 | Banerjea et al. | 370/338 |
| 2007/0248066 A1* | 10/2007 | Banerjea et al. | 370/338 |
| 2007/0248067 A1* | 10/2007 | Banerjea et al. | 370/338 |
| 2008/0151916 A1* | 6/2008 | Jetcheva et al. | 370/401 |
| 2008/0304485 A1* | 12/2008 | Sinha et al. | 370/392 |
| 2009/0116410 A1* | 5/2009 | Seok | 370/255 |
| 2010/0110995 A1* | 5/2010 | Shao et al. | 370/329 |
| 2010/0172249 A1* | 7/2010 | Liu | 370/252 |
| 2011/0119400 A1* | 5/2011 | Manion et al. | 709/242 |
| 2013/0121256 A1* | 5/2013 | Backes | 370/329 |
| 2014/0022948 A1* | 1/2014 | Backes | 370/254 |
| 2014/0030982 A1* | 1/2014 | Cardona | 455/67.11 |

OTHER PUBLICATIONS

Yair Amir et al., "An Inter-domain Routing Protocol for Multi-homed Wireless Mesh Networks", World of Wireless, Mobile and Multimedia Networks, Jun. 1, 2007, pp. 1-10; International Search Report.

Jin Xi et al., "Wireless Multihop Internet Access: Gateway Discovery, Routing, and Addressing", Proceedings, International Conference on Third Generation Wireless and Beyond, May 28, 2002, pp. 1-6, XP007904789; International Search Report.

* cited by examiner

METHOD FOR SUPPORTING ROUTING DECISIONS IN A WIRELESS MESH NETWORK AND WIRELESS MESH NETWORK

The present invention relates to a method for supporting routing decisions in a wireless mesh network, wherein said network includes a multitude of wireless mesh nodes and wherein at least two of said multitude of wireless mesh nodes function as wireless mesh gateways being connected to a wired infrastructure network via wired and/or wireless links.

Furthermore, the present invention relates to a wireless mesh network with routing decision support, comprising a multitude of wireless mesh nodes and wherein at least two of said multitude of wireless mesh nodes function as wireless mesh gateways being connected to a wired infrastructure network via wired and/or wireless links.

BACKGROUND OF THE INVENTION

In recent years, wireless mesh networks (WMNs) have emerged as a new technology that can be used to install wireless infrastructure in residential, campus, community, and even metropolitan areas. In a mesh network each network node is connected to one or more other nodes of the network. The operation of wireless mesh networks is similar to the operation of a network with fixed routers with the exception that the links established between the network nodes are wireless links. Typically, a wireless mesh network includes several nodes that have a wired/wireless connection to a wired infrastructure, in particular to the Internet. These nodes are referred to as mesh gateways. By establishing a (multi-hop) link to one of these mesh gateways the remaining mesh nodes of the network can also access the Internet.

Existing routing strategies in WMNs mostly focus on forwarding traffic between mesh nodes and mesh gateways due to a widespread assumption that the majority of traffic carried in WMNs either originates or terminates outside the WMNs. Due to this assumption, existing routing strategies usually form one or multiple forwarding trees rooted at the mesh gateways, as described for instance in A. Raniwala, T. Chiueh, Architecture and Algorithms for an IEEE 802.11-Based Multi-Channel Wireless Mesh Network, in IEEE Infocom 2005, March 2005.

Intra-mesh traffic (traffic that both originates and terminates inside WMNs) has received little attention so far. However, a recent measurement study of wireless campus networks shows that intra-mesh traffic can play an important role (T. Henderson, D. Kotz, and I. Abyzov, The changing usage of a mature campus-wide wireless network, ACM MobiCom 2004). For example, this measurement study showed that the percentage of intra-mesh traffic increased from 35.5% to 69.6% between 2001 and 2004. While this trend may not hold for all WMNs' usage and scenarios, it indicates that intra-mesh traffic can play an important role and also emphasizes the dynamic nature of WMNs' usage. For this reason, WMNs should provide efficient routing mechanisms for intra-mesh traffic.

FIG. 1 illustrates a wireless mesh network WMN 1 with a multitude of mesh nodes 2. The wireless connections between the mesh nodes 2 are indicated by solid lines. Besides the ordinary mesh nodes 2, the WMN 1 includes two mesh gateways 3 that are connected via a wired/wireless link to access routers 4 of a wired network 5. Until recently, as indicated in FIG. 1 by the dashed lines, intra-mesh traffic between two mesh nodes 2a, 2b is routed in a hop-by-hop manner inside the WMN 2. This routing strategy is widely used in WMNs and is described in some more detail e.g., in R. Draves, J. Padhye, and B. Zill, Routing in Multi-radio, Multi-hop Wireless Mesh Networks, ACM MobiCom 2004 or in J. Bicket, D. Aguayo, S. Biswas, and R. Morris, Architecture and Evaluation of an Unplanned 802.11b Mesh Network, ACM MobiCom 2005.

As illustrated in FIG. 2, in which like numerals are used for like components with respect to FIG. 1, it is also possible to divide the path between two mesh nodes 2a, 2b into three segments: (A) mesh node 2 to mesh gateway 3a, (B) between two mesh gateways 3a, 3b via the wired network 5, and (C) mesh gateway 3b to mesh node 2b. The rational behind this is that the wired network 5 can serve as a backbone to interconnect mesh nodes 2 in the WMN 1.

However, there is an essential problem associated with the aforementioned approaches: Depending on the link characteristics between the mesh gateways, it may or may not make sense to route intra-mesh traffic through the wired network. For example, if the wired network is over-provisioned, e.g., mesh gateways are connected by high-bandwidth links, it makes sense to route intra-mesh traffic through the wired network. However, if the wired network is under-provisioned, e.g., mesh gateways are connected by low-bandwidth links such as UMTS uplinks, it does not make sense to route intra-mesh traffic through the wired network. In this case, intra-mesh traffic unnecessarily competes with traffic between mesh and infrastructure network, and causes congestion at the mesh gateways. One way to solve this problem would be to define a routing policy at all mesh nodes that dictates whether intra-mesh traffic should be routed via the wired network. This routing policy is manually configured depending on the characteristics of the links connecting the mesh gateways. However, this solution is rather cumbersome.

SUMMARY OF THE INVENTION

It is therefore an object of the present invention to improve and further develop a method for supporting routing decisions in a wireless mesh network and a corresponding network of the initially described type in such a way that intra-mesh traffic is effectively routed between wireless mesh nodes such that congestion at the mesh gateways is reduced.

In accordance with the invention, the aforementioned object is accomplished by a method comprising the features of claim 1. According to this claim such a method is characterized in the steps of performing a discovery mechanism for said wireless mesh gateways to find and/or identify each other, establishing virtual wireless mesh links between said wireless mesh gateways via said wired infrastructure network, determining the characteristics of said virtual wireless mesh links, and announcing said characteristics to said wireless mesh nodes.

Furthermore, the aforementioned object is accomplished by a wireless mesh network comprising the features of independent claim 16. According to this claim, such a network is characterised in that it comprises a discovery mechanism for said mesh gateways to find and/or identify each other, said mesh gateways being configured to establish virtual wireless mesh links between each other via said wired infrastructure network, analyzing means for determining the characteristics of said virtual wireless mesh links, and communication means for announcing said characteristics to said wireless mesh nodes.

According to the invention it has first been recognized that the above-mentioned problems result from a lack of information on the side of the mesh nodes that shall take routing decisions in a self dependent fashion. More specifically, the root of the aforementioned problem is that mesh nodes do not know the characteristics of the links connecting the mesh gateways in the wired infrastructure network. Since these links belong to the wired infrastructure network, they are not advertised by the mesh gateways in the WMNs.

Further, it has been recognized that an efficient routing within a WMN can be achieved by allowing wireless mesh nodes to learn about the characteristics of the links connecting mesh gateways in the wired infrastructure network. Based on this knowledge, mesh nodes can make informed decisions whether it is more effective to route intra-mesh traffic through the wired network or not.

The proposed solution is supported by an automatic discovery mechanism that allows wireless mesh gateways, i.e. network nodes being attached to both the wireless mesh network and the wired infrastructure network, to find each other in a distributed and self-organizing manner. According to the invention, after having discovered each other, the mesh gateways establish virtual wireless mesh links that go through the infrastructure network. For instance, mesh gateways may create virtual wireless mesh interfaces that are used to connect to each other via links in the wired network. The resulting links are called virtual wireless mesh links. It is to be noted that these links are virtual since the path between two mesh gateways can comprise multiple hops in the wired network. A virtual wireless mesh link can be regarded as a tunnel inside the infrastructure domain that can be used to forward intra-mesh traffic.

According to the invention the characteristics of the established virtual wireless mesh links are determined and are then announced by the wireless mesh gateways as a regular wireless link in the wireless mesh network. By this means, wireless mesh nodes, i.e. network nodes in the wireless mesh network, are enabled to learn about the presence and characteristics of the virtual wireless mesh links, i.e. the links connecting mesh gateways in the wired network. Based on this knowledge, wireless mesh nodes can make informed routing decisions whether it is more effective to route intra-mesh traffic through the wired network or not. For instance, wireless mesh nodes can decide to route traffic through the wired infrastructure, e.g. in case the characteristic of at least one of the established virtual wireless mesh links proves to be of sufficient quality, or by means of hop-by-hop routing within the WMN, e.g. in case the virtual wireless mesh links have characteristics with low bandwidth. As a result, the effectiveness of intra-mesh traffic routing is enhanced and congestion at the wireless mesh gateways is avoided as far as possible.

The method according to the present invention is easy to implement and can work with any existing distance-vector or link-state routing protocol such as AODV (Ad-hoc On-demand Distance Vector), OSPF (Open Shortest Path First) or OLSR (Optimized Link State Routing).

Advantageously, the wireless mesh gateways are configured to send registration messages to a rendezvous node, typically at maximum intervals between registrations (i.e. "every x seconds at the latest") or at periodic/regular intervals. The rendezvous node may be configured to process the registrations from the wireless mesh gateways and to manage the presence of the wireless mesh gateways that have registered with the rendezvous node. In particular, it may be provided that the rendezvous node keeps track of the mesh gateways by maintaining a table that contains the wireless mesh gateways of a wireless mesh network from which the rendezvous node has received a registration. The table may be updated on a regular basis or each time the rendezvous node receives a registration. For facilitating the establishment of virtual wireless mesh links between the wireless mesh gateways, it may be provided that each mesh gateway periodically queries the rendezvous node to learn about the presence of other wireless mesh gateways.

According to an advantageous embodiment, the rendezvous node includes a central server that can be located in either the wireless mesh network or the infrastructure network. In particular, the central server may be a DNS or AAA server. In such embodiment, the mesh gateways only have to communicate with the central server by means of registration/query messages as described above without requiring the implementation of any special functionality. However, a supplementary component in form of the additional server is required.

Alternatively, it may be provided that the rendezvous node is chosen from all network nodes in either the wireless mesh network or the wired infrastructure network, i.e. the rendezvous node is determined by all network nodes in a distributed fashion. In other words, the role of the rendezvous node is taken over by an already existing node within the network (WMN or infrastructure) so that no additional component is required.

With regard to a reliable and unambiguous determination of the rendezvous node, it may be provided that the rendezvous node is chosen as a network node that is the first (or the last) in a strict total order over a set of nodes. For instance, the network nodes may be ordered by ascending/descending node IDs and the node with the lowest (or highest) node ID may be designated as rendezvous node. Instead of the node's ID, for instance, the node's IP address or its MAC address may be employed. Alternatively, the rendezvous node may be chosen as the node obtaining the best result (e.g. with highest/lowest value) of a specific mathematical operation performed on one or more parameters that uniquely identify a network node. For instance, the mathematical operation may be an algebraic operation or the calculation of a hash function. The parameter for these mathematical operations can be, for example, a node ID, a router ID, an IP address, or a MAC address. In this regard it is important to note that in case of employing a distance-vector or link-state routing protocol such as AODV, OSPF or OLSR, each participating node has a unique node ID or router ID. Since all mesh nodes participate in the distance-vector or link-state routing protocol and can learn about other nodes in the network, the rendezvous point can be easily determined.

If a mesh node is not the rendezvous node (e.g., it is aware of a node with a lower node ID in case the lowest node ID is taken as criterion for the designation of the rendezvous node), but it receives a registration from other nodes, it may be provided that such mesh node sends back a redirection to these nodes. The redirection points these nodes to the node with a lower node ID. Redirections can work in a successive manner until registrations finally reach the mesh node that actually functions as rendezvous node (i.e., in the context of the example described above, the mesh node that has the lowest node ID). Thus, a reliable determination of a unique rendezvous point also works even when mesh nodes only have a partial view of the network.

To increase reliability, a rendezvous node may also have a backup node (i.e., in the context of the example described above, the mesh node with second lowest node ID). This node backs up the registrations of all mesh gateways. When the backup node detects a failure of the rendezvous node, it takes over the rendezvous node's functionality. Multiple backup nodes are also possible.

According to still another preferred embodiment, the discovery mechanism foresees that wireless mesh gateways periodically announce their presence in the wireless mesh network or the wired infrastructure network, respectively. The announcements are then propagated in the wireless mesh network or in the wired infrastructure network, respectively, wherein the propagation may be realized by means of flooding the announcements. In such case, a wireless mesh gateway can learn about the presence of the other wireless mesh gateways from their announcements and can easily establish virtual wireless mesh links going through the infrastructure network with them.

As what regards the mechanism for determining the specific characteristics of a virtual wireless mesh link, it may be provided that the wireless mesh gateways are configured to periodically send probes on that virtual wireless mesh link in order to estimate the characteristics of the link. The characteristics, also referred to as "metrics", typically include, but are not restricted to, link capacity, link delay, load levels, or packet loss rates. Alternatively or additionally, it may be provided that the virtual wireless mesh link established between two wireless mesh gateways carry one or multiple link metric(s) that are set in a static manner (e.g. bandwidth of a virtual wireless mesh link is always 5 Mbps). The mesh gateways may use these statically configured parameters to specify the characteristics of a virtual wireless mesh link. Furthermore, the link metrics of virtual wireless mesh links may be determined by using external routing information of another routing protocol. For instance, the characteristics may be extracted from the external routing information by applying appropriate computing or translation techniques. In this context, "external" means outside of the wireless mesh network, e.g. routing information available in the wired infrastructure network. For example, the wired infrastructure network might use BGP (Border Gateway Protocol) or other routing protocols that provide useful information for determining the characteristics of the virtual wireless mesh links.

With respect to an effective distribution of the characteristics of the virtual wireless mesh links to the mesh nodes of the WMN, it may be provided that the wireless mesh gateways announce the presence and characteristics of the links in the WMN as regular wireless links. For such injection of virtual links' characteristics into a mesh domain, the mesh gateways can use any routing protocol (e.g. link state and distance vector routing) to advertise the virtual wireless mesh links just as regular links between adjacent nodes. A distance-vector or link-state routing protocol proves to be particularly advantageous as it can propagate single or multiple characteristics ("metrics") of virtual wireless mesh links in WMNs. Thus, by using a distance-vector or link-state protocol, mesh nodes can be informed about the characteristics of the links in the wired network connecting the mesh gateways. In other words, a distance-vector or link-state routing protocol is simply used as a vehicle to distribute information about the links connecting mesh gateways in the wired network. Based on this information, mesh nodes can make an informed distributed decision whether it would make sense to route intra-mesh traffic through the wired network or not. There are no specific requirements for distance-vector or link-state routing protocols so that any distance-vector or link-state routing protocol may be employed, for instance AODV, OSPF or OLSR.

BRIEF DESCRIPTION OF THE DRAWINGS

There are several ways how to design and further develop the teaching of the present invention in an advantageous way. To this end, it is to be referred to the patent claims subordinate to patent claims 1 and 16 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings

DETAILED DESCRIPTION OF THE PREFERRED EMBODIMENTS

Figure 2:
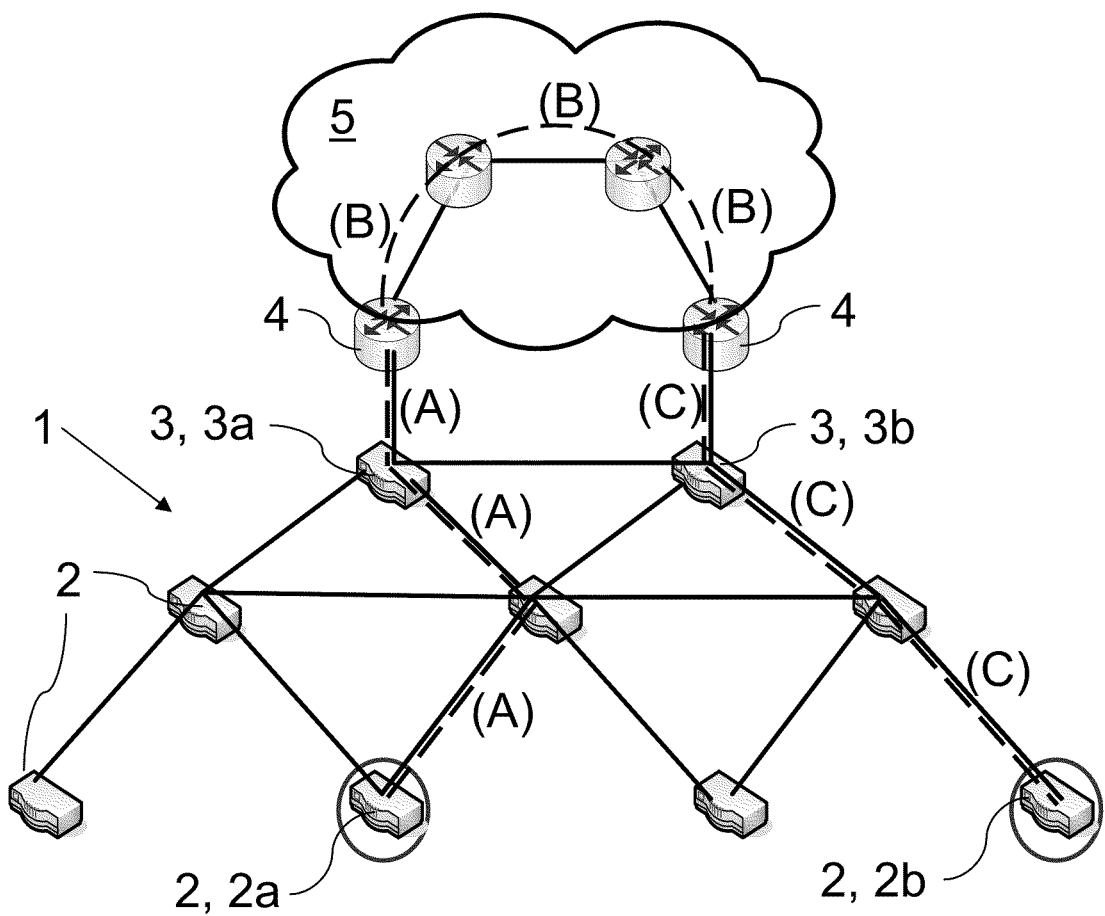
FIG. 2 illustrates a prior art routing method for routing intra-mesh traffic through a wired infrastructure network.
Figure 3:
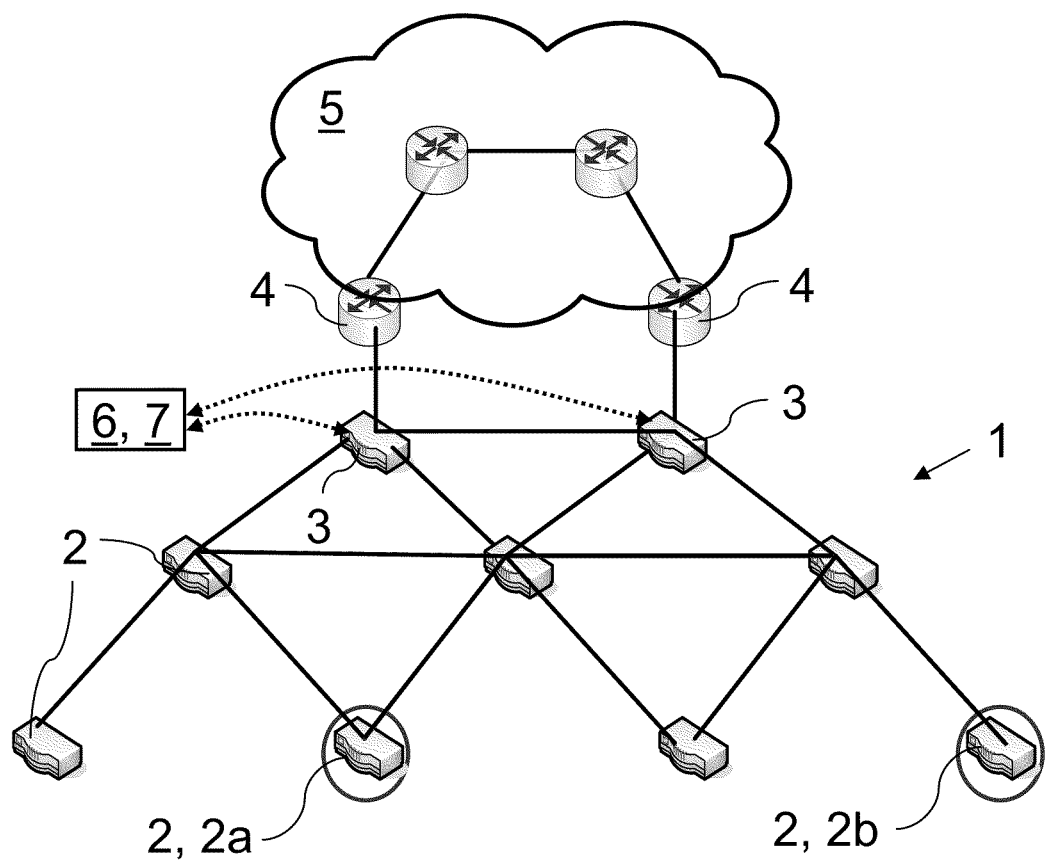
FIG. 3 illustrates the method in accordance with the present invention in one specific embodiment of a wireless mesh network.

Referring to FIG. 3, an exemplary WMN 1 is depicted which is operative in a manner consistent with the present invention. In principle, the wireless mesh network 1 depicted in FIG. 3 is very similar to the WMNs illustrated in FIGS. 1 and 2. Like numerals are used for like components with respect to the scenarios discussed in connection with FIGS. 1 and 2, and their detailed description is omitted.

The mesh gateways 3 of the WMN 1 are connected via a wired/wireless link to an infrastructure network 5 via access routers 4. For the sake of simplicity and clarity only two of the mesh gateways 3 are shown, however, in real environments there are assumed to be many more of them. The infrastructure network 5 provides Internet connectivity for the wireless mesh gateways 3 and is a wired network. However, it is to be noted that the infrastructure network can also be a wireless network in special cases.

Figure 1:
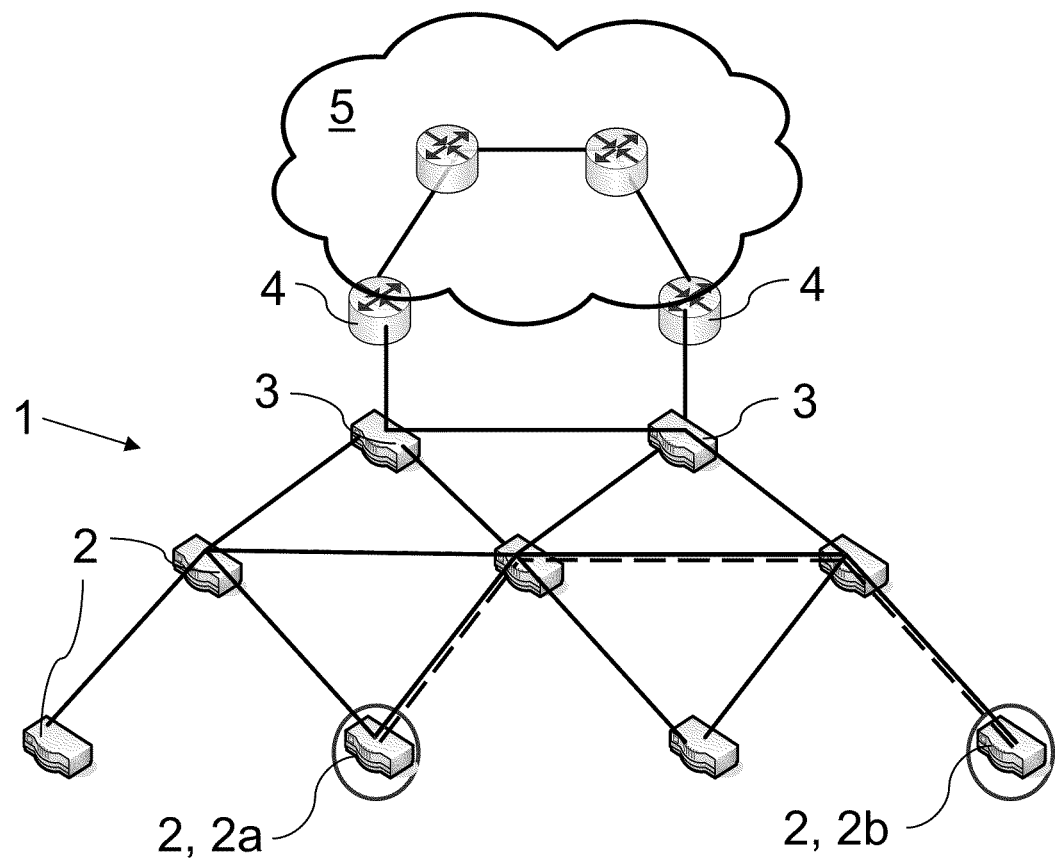
FIG. 1 illustrates a prior art routing method for hop-by-hop routing of intra-mesh traffic inside a WMN.

In contrast to the scenarios of FIGS. 1 and 2, a central server 6 is provided in the embodiment of FIG. 3. In the specific embodiment, the central server 6 is a DNS server (Domain Name Server) that is located in the wireless mesh network 1. The server 6 is designed as a rendezvous node 7 that keeps track of the mesh gateways 3. More specifically, the rendezvous node 7 is configured to receive registrations from the mesh gateways 3, which is indicated by the dotted lines. The rendezvous node 7 maintains a table with entries of wireless mesh gateways 3 of the wireless mesh network 1 from which the rendezvous node 7 has received a registration. The table is updated each time the rendezvous node 7 receives such registration. To keep the system updated, the mesh gateways 3 refresh their registrations frequently.

The mesh gateways 3 are configured to periodically query the rendezvous node 7 to learn about the presence of other wireless mesh gateways 3. Like the registration messages, the queries are also indicated by the dotted lines. After having discovered each other, the mesh gateways 3 establish virtual wireless mesh links with each other that go through the infrastructure network 5. The links are called virtual wireless mesh links since the path between two mesh gateways 3 can comprise multiple hops in the wired network 5.

In a next step each mesh gateway 3 determines the characteristics ("metrics") of all virtual wireless mesh links it has established with other mesh gateways 3. To this end, the mesh gateways 3 periodically send probes in form of test packets on the virtual wireless mesh links. Alternatively or additionally, static configurations and/or external routing information will be employed to specify the virtual links' characteristics. The results that are obtained in the context of these testing procedures are then injected into the wireless mesh network 1 where the results are propagated by using a distance-vector or link-state routing protocol.

By receiving information about the quality of the virtual wireless mesh links, in particular with respect to bandwidth, load levels, capacity, delay and packet loss, wireless mesh nodes 2 are enabled to make an informed decision of how to route their intra-mesh traffic. For instance, mesh node 2a intending to send data to mesh node 2b can decide on the most beneficial routing strategy (with respect to certain objectives that may be specified by the mesh node itself or that may result from policies that are valid for the entire WMN 1). In particular, based on information about the characteristics of the virtual wireless mesh links established among the mesh gateways 3, mesh node 2a may decide to route traffic to mesh node 2b within the WMN 1 (as illustrated in FIG. 1) or through the wired infrastructure 5 (as illustrated in FIG. 2). As a result, congestion at the mesh gateways 3 due to intra-mesh traffic being routed via poor links in the wired network 5 (e.g. with low-bandwidth and high delay) is effectively avoided.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting routing decisions in a wireless mesh network (1) that includes a multitude of wireless mesh nodes (2) and wherein at least two of said multitude of wireless mesh nodes (2) function as wireless mesh gateways (3) being connected to a wired infrastructure network (5) via wired and/or wireless links, comprising the steps of:

performing a discovery mechanism for said wireless mesh gateways (3) to find and/or identify each other;

establishing virtual wireless mesh links between said wireless mesh gateways (3) via said wired infrastructure network (5);

determining characteristics of said virtual wireless mesh links; and announcing said characteristics to said wireless mesh nodes (2), wherein said discovery mechanism includes the step of said wireless mesh gateways (3) sending registrations to a rendezvous node (7), and wherein said wireless mesh gateways (3) query said rendezvous node (7) at predefined intervals to learn about the presence of other wireless mesh gateways (3).

2. A method for supporting routing decisions in a wireless mesh network (1) that includes a multitude of wireless mesh nodes (2) and wherein at least two of said multitude of wireless mesh nodes (2) function as wireless mesh gateways (3) being connected to a wired infrastructure network (5) via wired and/or wireless links, comprising the steps of:

performing a discovery mechanism for said wireless mesh gateways (3) to find and/or identify each other;

establishing virtual wireless mesh links between said wireless mesh gateways (3) via said wired infrastructure network (5);

determining characteristics of said virtual wireless mesh links; and announcing said characteristics to said wireless mesh nodes (2), wherein said discovery mechanism includes the step of said wireless mesh gateways (3) sending registrations to a rendezvous node (7), wherein said rendezvous node (7) is chosen from all network nodes in the wireless mesh network and/or the infrastructure network, and wherein a network node that, without being designated as said rendezvous node (7), receives a registration from a wireless mesh gateway and sends back a redirection to that wireless mesh gateway indicating said rendezvous node (7).

3. A method for supporting routing decisions in a wireless mesh network (1) that includes a multitude of wireless mesh nodes (2) and wherein at least two of said multitude of wireless mesh nodes (2) function as wireless mesh gateways (3) being connected to a wired infrastructure network (5) via wired and/or wireless links, comprising the steps of:

performing a discovery mechanism for said wireless mesh gateways (3) to find and/or identify each other;

establishing virtual wireless mesh links between said wireless mesh gateways (3) via said wired infrastructure network (5);

determining characteristics of said virtual wireless mesh links; and announcing said characteristics to said wireless mesh nodes (2), wherein said discovery mechanism includes the step of said wireless mesh gateways (3) announcing their presence in said wireless mesh network at predefined intervals, wherein said announcements are propagated in said wireless mesh network.

* * * * *